United States Patent
Vallee et al.

(10) Patent No.: US 10,860,360 B2
(45) Date of Patent: Dec. 8, 2020

(54) MAINFRAME COMPUTER HAVING A VIRTUALIZED PROPRIETARY MAINFRAME SOFTWARE ENVIRONMENT

(71) Applicant: BULL SAS, Les Clayes-sous-Bois (FR)

(72) Inventors: Florence Vallee, Paris (FR); Patrice Bleuze, Bougival (FR); Thierry Bonnel, Herblay (FR); Jean-Luc Heitz, Paris (FR)

(73) Assignee: BULL SAS, Les Clayes-sous-Bois (FR)

( * ) Notice: Subject to any disclaimer, the term of this patent is extended or adjusted under 35 U.S.C. 154(b) by 63 days.

(21) Appl. No.: 16/232,664

(22) Filed: Dec. 26, 2018

(65) Prior Publication Data

US 2019/0205152 A1    Jul. 4, 2019

(30) Foreign Application Priority Data

Dec. 29, 2017    (FR) ...................................... 17 63385

(51) Int. Cl.
*G06F 9/455* (2018.01)
*G06F 9/50* (2006.01)
*G06F 8/61* (2018.01)

(52) U.S. Cl.
CPC ........ *G06F 9/45558* (2013.01); *G06F 9/5077* (2013.01); *G06F 8/61* (2013.01); *G06F 9/45541* (2013.01); *G06F 2009/45566* (2013.01); *G06F 2009/45579* (2013.01); *G06F 2009/45587* (2013.01); *G06F 2209/5011* (2013.01); *G06F 2209/5012* (2013.01)

(58) Field of Classification Search
CPC .................................................. G06F 9/45533

USPC ............................................................. 718/1
See application file for complete search history.

(56) References Cited

U.S. PATENT DOCUMENTS

| | | | |
|---|---|---|---|
| 8,429,276 B1* | 4/2013 | Kumar | G06F 9/45533 709/226 |
| 10,298,512 B2* | 5/2019 | Wang | H04L 47/70 |
| 10,397,062 B2* | 8/2019 | Chen | H04L 47/125 |
| 2002/0156824 A1 | 10/2002 | Armstrong et al. | |
| 2009/0055830 A1 | 2/2009 | Gusler et al. | |
| 2011/0154322 A1 | 6/2011 | Nayar et al. | |

(Continued)

OTHER PUBLICATIONS

Search report and written opinion issued in corresponding French Patent Application No. FR1763385 dated Nov. 19, 2018, 8 pages.

(Continued)

*Primary Examiner* — Andy Ho
(74) *Attorney, Agent, or Firm* — Pearne & Gordon LLP

(57) ABSTRACT

A mainframe computer is disclosed including a hardware platform (10) with hardware resources comprising processors and memory. The computer comprises a virtualization hypervisor software of the market (300). Thus, an instance (1) of a proprietary Mainframe software environment can run on the hardware architecture, in at least one first virtual machine that can run on the virtualization hypervisor. In order to guarantee the security/reliability and the performance of the mainframe computer, the virtualization hypervisor is configured so as to create a hardware resource pool (100) of the hardware platform that is dedicated to hosting, exclusively, the one (or more) virtual machine(s) in which an instance of the proprietary Mainframe software environment is running.

12 Claims, 2 Drawing Sheets

(56) References Cited

U.S. PATENT DOCUMENTS

Figure 1:
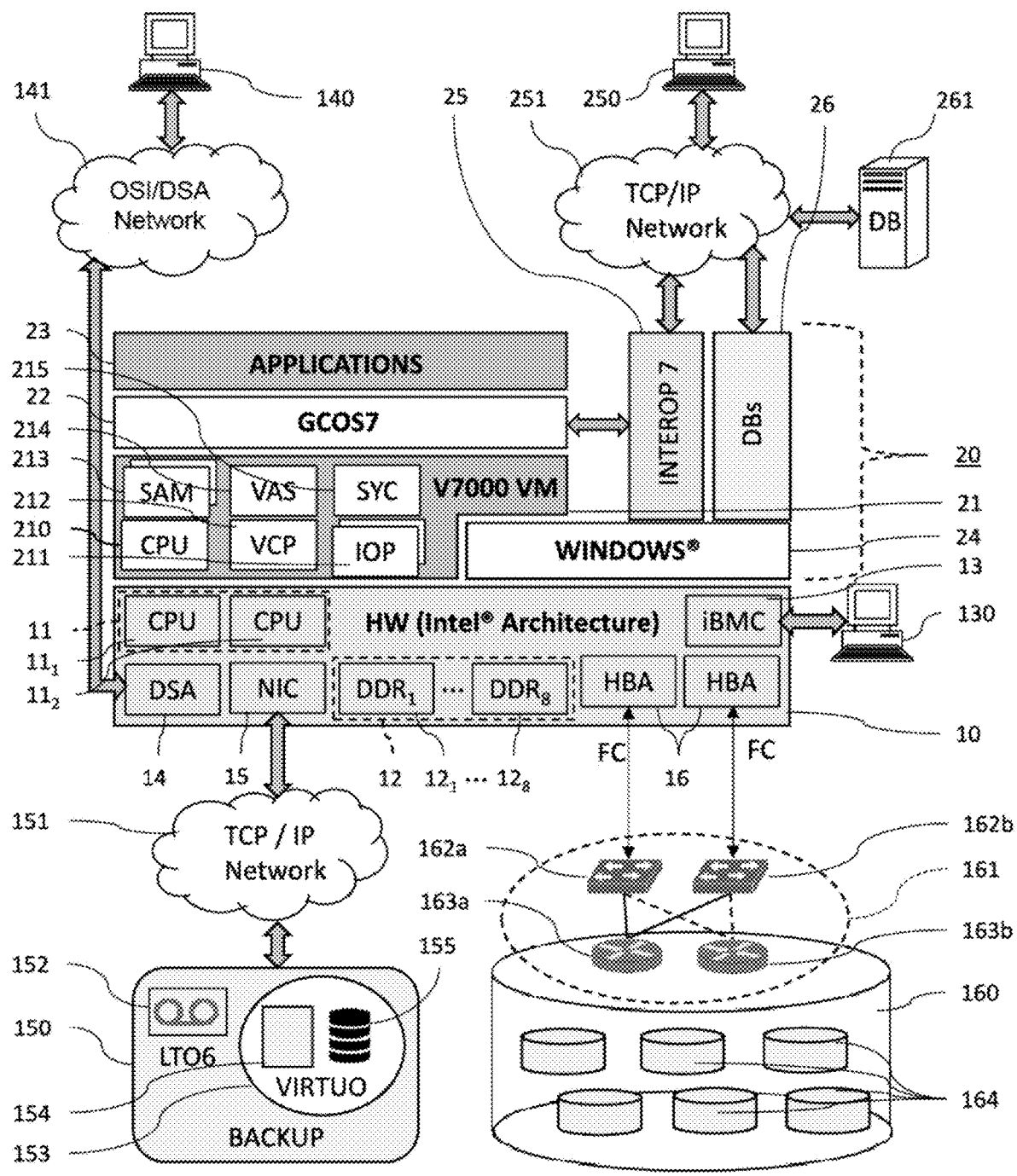

2015/0121371 A1* 4/2015 Gummaraju ............ G06F 16/27
  718/1
2018/0063026 A1* 3/2018 Beveridge .............. G06Q 30/08

OTHER PUBLICATIONS

Anonymous. "Hitachi Virtage Embedded Virtualization." Oct. 30, 2008. 6 pages.

* cited by examiner

MAINFRAME COMPUTER HAVING A VIRTUALIZED PROPRIETARY MAINFRAME SOFTWARE ENVIRONMENT

The present invention generally relates to the field of mainframe computers (in English "mainframe computer") or servers, also called Mainframes machines, or simply Mainframes in the language of the person skilled in the art.

In particular, the invention relates to a mainframe computer having a virtualized proprietary Mainframe software environment, and more particularly to a first virtual machine able to run on a virtualization hypervisor of the market.

PRIOR ART

A Mainframe is a high-power processing computer, which serves as a central unit for a network of terminals. Until the 1980s, such computers operated according to a centralized model, which is opposed to distributed models. Such mainframe computers are used in very large organizations, whether public (such as French administrations) or private (such as banks or insurance companies). Mainframe computers allow the processing of very large databases accessed by tens or hundreds of thousands of users, under very high reliability constraints.

Originally, in the 1960s, the Mainframes were all proprietary systems, that is to say global platforms composed of hardware and software specific to each manufacturer. They are referred to as proprietary hardware/software ("legacy hardware/software", in English).

Then, from the middle of the 1980s, separating hardware, on the one hand, and software, on the other hand, was envisaged. This separation was proposed for reasons of price competitiveness, due to the emergence of processors costing less than proprietary processors from the historical Mainframe manufacturers. Circuit designers were indeed led to reconsider their investment strategy in research and development in the field of processors. The production volumes achieved on the PC market and the workstation market from the 1980s, indeed allowed circuit designers like Intel to amortize their investments with a much greater leverage than for Mainframe manufacturers.

As a result, a first virtualization layer was introduced in the Mainframes from the early 2000s, in order to run an emulation of the proprietary operating system (for example GCOS for the Mainframes DPS/7 and DPS/8 from BULL), on an open operating system (namely, of the market, of the Windows® type from Microsoft or of the AIX® type from IBM) on a hardware platform of the market (of the Intel-, BULL-, NEC-type, etc.) comprising, in particular, commodity processors (or CPU, from the English "Central Processing Unit") of the market ("Commodity processors" in English).

Maintaining a proprietary operating system for Mainframe machines on a hardware architecture of the market stemmed from the need to comply with requirements specific to these machines, in terms of performance, reliability and availability, that only a proprietary operating system, specifically designed and used for this type of machines, allowed (and still does) to meet. In addition, it was, of course, necessary to assure existing clients that their applications would remain able to run as-is (namely at the binary level without recompilation), and that their investments in hardware would be preserved, that is to say that the majority of the peripherals would be re-connectable notwithstanding the proprietary hardware platform being abandoned.

In this context, the BULL machines of the DPS 7000/XTA family (where the acronym XTA stands for "eXtended Twin Architecture") allowed the emulation of the proprietary operating system GCOS 7 and of all its environment, on a new hardware platform of the market, in this case the Intel® architecture (or IA, for "Intel Architecture"), controlled by an operating system of the market, in this case Microsoft Windows®, functioning as a server. This emulation of GCOS 7 on the IA architecture is based on the virtualization software V7000 provided by BULL with its servers. That is why, to designate the specificity of these Mainframe machines in which the GCOS 7 environment is managed on a platform of the market (operating system and hardware of the market), reference is generally made to V7000 virtual machines.

At the same time, new user needs have appeared: the need to concentrate the Mainframe machines, that is to say for example to group the execution of several applications on a same operating system; the need to reduce the number of physical machines, and/or to group them on a same site, etc. This has led to the expansion of the operating system in terms of memory management capacity and capacity for hosting storage peripherals, increased performance, etc.

Many solutions may have been considered, even explored, without actually constituting accomplished achievements necessarily constituting a prior art identified as part of the state of the art.

In order to optimize the Mainframe machine computing infrastructure, a first solution may consist in extending the processing capabilities of the Mainframe itself. Said increased capacity of a Mainframe can be achieved by performing extensions in the basic software components of the Mainframe operating system. This can help to ensure the consolidation of the proprietary servers and the pooling of the applications on a same machine. Indeed, a more powerful machine allows to replace several other less powerful machines. However, the general architecture of the Mainframes was conceived at a time when the capacity of the computer systems was reduced in terms of computing or processing power (related to the number of processors), RAM capacity, disk capacity, number of applications running simultaneously, for example. As a result, the architectural constraints of the Mainframes prevent from continuing to evolve in this direction.

Another solution might consist in developing a proprietary virtualization hypervisor, that would allow to run a more complex Mainframe. However, such a solution appears to be too restrictive. In particular, it would not allow the Mainframe to be integrated in a heterogeneous and open environment.

Yet another solution would be to turn the Mainframe into an unmarked application running in a virtual machine. However, such a solution would not guarantee the level of performance, the security and the reliability that are specific to Mainframe machines.

Thus, there is a need for a new mainframe-type device including a proprietary Mainframe software environment and capable of addressing the problems created by existing solutions.

TECHNICAL PROBLEM

The object of the present invention is therefore to overcome the disadvantages of the state of the art and is a continuation of the technological evolution of mainframe computers that was presented above. In summary, it then came to extending the limits of the proprietary operating system. However, the limit of what was feasible with this architecture of Mainframe machines with a virtualized proprietary operating system has now been reached. It should be noted that the invention has been made in a context where the general trend in computing is to make virtual machines for producing on demand computing, while the person skilled in the art nonetheless knows that the virtualization technique is obviously hampered by the specificities of Mainframe machines. Indeed, running a proprietary operating system of a mainframe computer in a virtual machine running on a virtualization hypervisor is subject to constraints that are generally not supported by the virtualization hypervisors of the market.

The problem is to define a new technique for virtualizing a Mainframe guaranteeing the resources and the performance are at a same level as when running a Mainframe directly on a dedicated hardware platform, such as the historical platform of the mainframe computers DPS 7000 from BULL.

BRIEF DESCRIPTION OF THE INVENTION

To this end, the invention proposes to implement a second virtualization level, in addition to the virtualization already used in the BULL machines of the DPS 7000/XTA family which was presented in the introduction. The principle of the embodiments is to operate the proprietary Mainframe software environment in a virtual machine (or VM, from the English "Virtual Machine") with the meaning of a virtualization hypervisor of the market, such as, for example, a software from the virtualization software range VMware. In other words, the general principle of the embodiments of the invention consists in running the proprietary operating system like GCOS 7, which is itself emulated on an operating system of the market like Microsoft Windows®, in a virtual machine running on a virtualization hypervisor of the market like VMware™ vSphere®. However, the invention is not limited to that. In fact, the provided embodiments also allow to satisfy the binding specifications of the existing Mainframes, regarding the safety/reliability, operational performance and availability aspects. However, achieving such a result is a complicated task in a virtualized environment managed by a virtualization hypervisor of the market. Indeed, on a virtualization hypervisor of the market like the ones of the VMware range, all virtual machines share the processors and memory, precisely because of the virtualization principle and objectives which lie on sharing the resources and flexibility of the applications in the shared use of these resources. The virtualization hypervisor is natively designed to optimize the sharing of the resources from this point of view. Thus, encapsulating the Mainframe in a virtual machine running on a standard virtualization hypervisor of the market is a priori incompatible with the compliance with security/reliability, operational performance and availability requirements of the Mainframes.

To overcome this problem, a first aspect of the invention provides a mainframe computer including:
a hardware platform with hardware resources comprising processors and memory;
a virtualization hypervisor software of the market;
a proprietary Mainframe software environment, at least one instance of which is able to run on the hardware architecture, in at least one first virtual machine (or Mainframe virtual machine) that can run on the virtualization hypervisor,
wherein:

the virtualization hypervisor is configured so as to create a first hardware resource pool of the hardware platform (or privileged Mainframe resource pool) that is dedicated to hosting, exclusively, the at least one first virtual machine in which the instance of the proprietary Mainframe software environment can run.

In other words, the invention provides a new for virtualizing a Mainframe guaranteeing the resources and therefore the performance are at a same level as when running a Mainframe directly on a dedicated hardware platform, such as in existing mainframe computers.

Indeed, thanks to the configuration of the virtualization hypervisor which creates a hardware resource pool dedicated to the Mainframe environment, achieving a quantity of resources offered to the proprietary operating system, GCOS 7 for example, is guaranteed, and this regardless of the load of the virtualization hypervisor.

Advantageously, the virtualization technique is fully compatible with the features of the virtualization hypervisors of the market for benefiting both from the reliability of the Mainframes and the optimization of the IT infrastructure that virtualization can bring.

In some embodiments, the instance of the proprietary Mainframe software environment comprises:
a proprietary simulation software;
a proprietary operating system able to run on the proprietary simulation software, and responsible for ensuring the connection between the hardware resources of the first hardware resource pool through the proprietary simulation software, on the one hand, and applications designed to run on said proprietary operating system, on the other hand, when said applications are running; as well as,
an open operating system, on which the proprietary simulator and the proprietary operating system can run.

Thus, the Mainframe virtual machine can use the same assembly as the GCOS 7 instances in the servers DPS 7000/XTA from BULL ATOS, without modifications.

The instance of the proprietary Mainframe software environment may further comprise one or more interoperability components between the proprietary operating system and open systems and external databases with which it can communicate and interact, with said interoperability components being able to run on the open operating system. This allows to take advantage of open world databases and software, such as in the servers DPS 7000/XTA from BULL ATOS.

In some implementation modes, the virtualization hypervisor software is capable of running several instances of the proprietary Mainframe software environment, with respective performance models, in respective virtual machines that can run concurrently on the hardware platform while being all hosted in the first hardware resource pool of the hardware platform. The hardware resource Mainframe pool hosting the one or more virtual machines of the Mainframe environment may be defined based on the performance model targeted in terms of processing power (associated with the processors) and memory resource, and based on the number of instances of Mainframe virtual machines.

Advantageously, the mainframe computer may also comprise an open software environment, of which at least one instance is able to run concurrently on the hardware platform, in at least one second virtual machine (or Client virtual machine) that can run on the virtualization hypervisor software, and, in such a case:
the hardware resources of the hardware platform comprise a second hardware resource pool (or Client resource pool)

created by configuring the virtualization hypervisor, for hosting, exclusively, the at least one second virtual machine; and, the open software environment comprises an open operating system responsible for ensuring the connection between the hardware resources of the second hardware resource pool, on the one hand, and open-world applications designed to run on said open operating system, on the other hand, when said applications are running.

The client then benefits from all the possibilities offered by the "open world", with the possibility to run on the mainframe computer applications that, where appropriate, run on another known operating system such as Linux® or Unix®. In particular, he may deploy such applications that he has developed or that belong to him, without any link to the manufacturer of his mainframe computer.

In some implementation modes, the virtualization hypervisor software is capable of running several virtual machine instances of the open software environment that can run concurrently on the hardware platform, while being all hosted in the second hardware resource pool of the hardware platform (Client pool).

A second aspect of the invention relates to a method of configuring a mainframe computer for obtaining a mainframe computer having a virtualized proprietary Mainframe software environment, said computer including a hardware platform with hardware resources comprising processors and memory, wherein the method comprises the following steps:

installing a virtualization hypervisor software of the market;
installing an open operating system;
installing a proprietary Mainframe software environment, at least one instance of which is able to run on the hardware architecture, in at least one first virtual machine that can run on the virtualization hypervisor; and,
configuring the virtualization hypervisor so as to create a first hardware resource pool of the hardware platform that is dedicated to hosting, exclusively, the at least one first virtual machine in which the instance of the proprietary Mainframe software environment can run.

In particular, the steps of the configuration method can be implemented according to the instructions of an operator transformed into a series of commands interpreted by the mainframe computer.

In some implementations, installing the proprietary Mainframe software environment comprises:
installing a proprietary simulation software so that it can run on the open operating system;
installing a proprietary operating system so that it can run on the proprietary simulation software, for ensuring the connection between the hardware resources of the first hardware resource pool through the proprietary simulation software, on the one hand, and applications designed to run on said proprietary operating system, on the other hand, when said applications are running while the proprietary simulator and the proprietary operating system are running on the open operating system.

Figure 2:
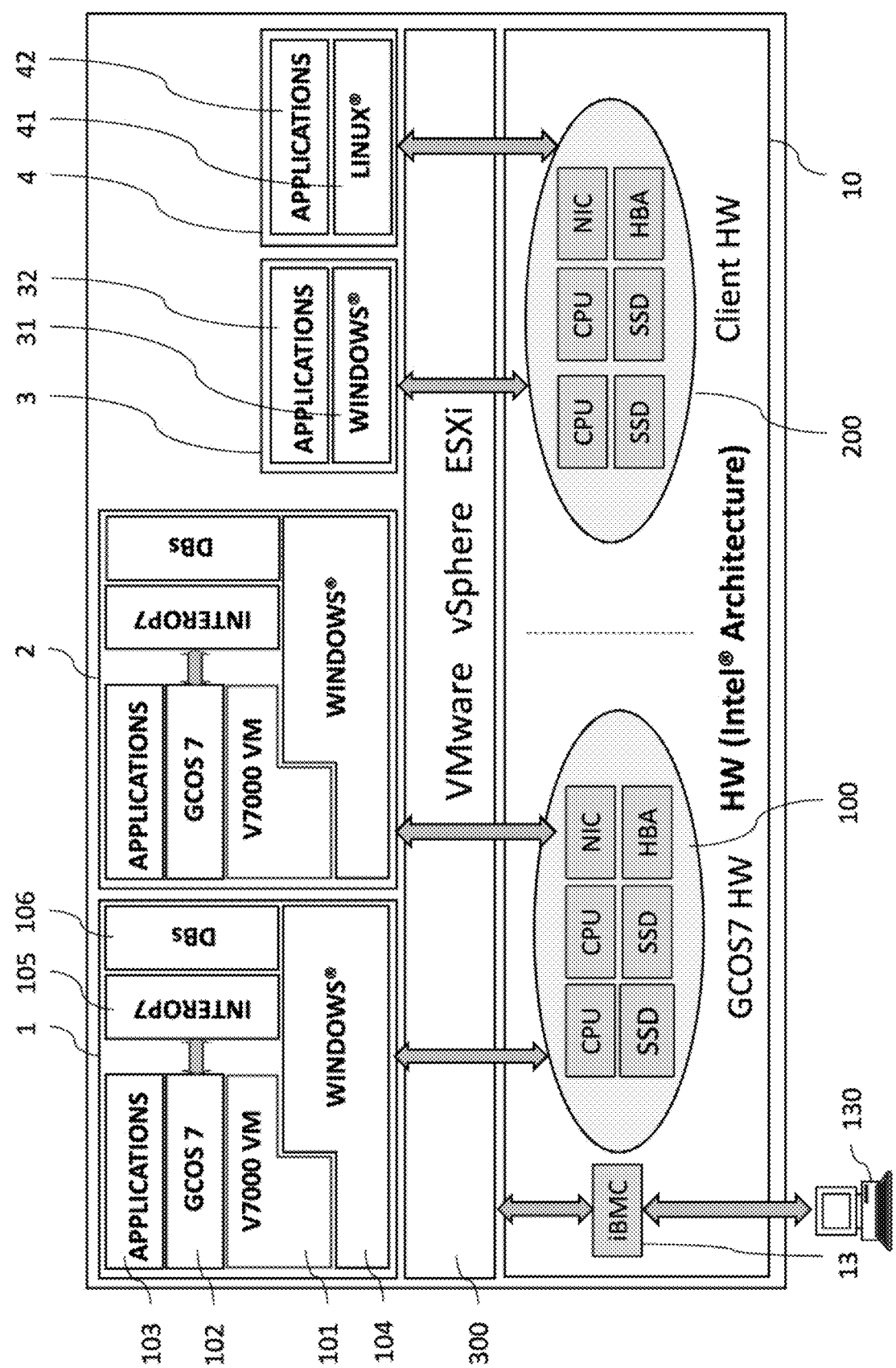

Other advantages and features of the invention will appear upon reading the following description given by way of illustrative and non-limiting example, with reference to the appended Figures which represent:

FIG. 1, a functional diagram of a mainframe computer of the DPS 7000/XTA- or Bullion-type, in which the proprietary operating system GCOS 7 runs on an emulation of the expected hardware platform that is provided by a proprietary simulator, namely V7000; and, FIG. 2, a functional diagram illustrating the encapsulation of the Mainframe environment of a mainframe computer in a virtual machine running on a virtualization hypervisor, in accordance with embodiments of the invention.

DESCRIPTION OF THE INVENTION

In the following description of embodiments and in the accompanying drawings, the same or like elements have the same numerical references to the figures.

A mainframe computer, or Mainframe, is a multiprocessor system used in transactional and interactive data production and batch data processing environments. It is dedicated to the critical applications of organizations (public administrations, companies, etc.) that must operate under strong constraints such as high availability, security and interoperability with open systems. It allows to be used by a large number of simultaneous transactional users.

A Mainframe is based on a proprietary operating system providing all the basic functions. In particular, it supports the virtual memory management, processing scheduling, input/output supervision, sharing and optimization of resource use, etc. Input-output operations comprise the access to traditional peripherals, including a cartridge (namely cart tape) reader, and the reception and transmission of data via the one (or more) telecommunications network(s) the Mainframe is connected to. To support these operations, the hardware architecture comprises adapters, such as network cards, for example.

The description of embodiments of the innovation will be given hereinafter with reference to an example of application to a Mainframe machine using the proprietary operating system GCOS 7 from BULL ATOS. It is well understood, however, that implementing the invention is not limited to this example.

Firstly, the classical architecture of Mainframe machines, such as the servers of the Bullion family, will be described. It is a family of servers developed by BULL ATOS. They support Mainframe applications under GCOS 7, which is a proprietary operating system of BULL ATOS. These machines run an instance of the proprietary operating system GCOS 7, through a V7000 virtual machine built on an open operating system of the market like Microsoft™ W2102R2® or Microsoft Windows Server®, running on an Intel® hardware architecture (IA) based on 32-bit Intel™ Xeon® E7 processors. V7000 is a proprietary simulation software, which emulates the proprietary hardware platform expected by the proprietary operating system GCOS 7, from the Intel® platform of the market actually used.

The person skilled in the art will appreciate, however, that this is only an example of a Mainframe server to which the principle of the invention can be applied. The latter may indeed find advantageous applications in other Mainframes servers relying on other hardware platforms, for example the mainframe computers of the Novascale® range from BULL ATOS running on an Intel™ hardware architecture (IA) based on 64-bit Intel™ Itanium® processors. Indeed, the implementation of the invention is independent of the hardware platform of the server.

Of course, the invention applies more generally to any type of Mainframe server based on the execution of a proprietary operating system.

The functional diagram of FIG. 1 schematically shows, by way of example only as stated above, the hardware platform 10 and the software layers 20 of a server module Bullion S2 of the Bullion range, from BULL ATOS. This example will serve as a basis for the description of embodiments with reference to FIG. 2.

The hardware architecture 10 is an Intel™ architecture (IA), which comprises Intel™ processors such as Intel™ Xeon® E7 v4 processors. Alternatively, Intel® 64-bit Itanium® processors may also be used. Intel™ Xeon® E7 v4 processors each have from 4 to 24 processor cores, depending on the versions, and they can therefore support up to 48 threads (or threads) at the most. These processors have an L3-type cache memory with a memory capacity of up to 60 MB, shared between the different cores. In the example shown in FIG. 1, the server module includes a set of sockets 11 including two processors $11_1$ and $11_2$. However, the servers of the Bullion range may include more processors, in this case up to sixteen processors for the servers Bullion S16 which have sixteen sockets.

Indeed, the Bullion range offers four versions, namely S2, S4, S8 and S16, which comprise one, two, four or eight identical 3U-sized modules, respectively. Where appropriate, the modules are assembled in columns, according to a modular architecture, via a cableless connection system (the so-called connectics technology "Connecting Box" from BULL ATOS). They offer models with a power ranging from 2-Processors/48 GB-RAM for the Bullion S2 up to 16-Processors/24 TB-RAM for the Bullion S16. With two processors and up to 48 cores, the first one of the range, namely the Bullion S2 can therefore support up to 96 threads. As for the last one of the range, namely the Bullion S16, it can support up to 768 threads with its 16 processors offering up to 384 cores at the most.

The memory 12 comprises between one and eight memory blades ("Memory Blades", in English), and more particularly eight blades $12_1$ to $12_8$ in the example shown. For example, they may be semiconductor disks (or SSD, from the English "Solid State Drive"). An SSD is a computer storage device similar to a hard drive, but much faster and more reliable especially since it does not include any moving parts. An SSD uses a Flash-type memory, which provides almost instantaneous start and loading times. Each memory blade $12_1$ to $12_8$ can have a capacity between 48 GB and 384 GB, which offers a maximum total capacity of 3 TB (terabytes).

For the management of the machine, the hardware platform 10 further includes a management controller 13 (or iBMC, from the English "Integrated Baseboard Management Controller"). This iBMC allows an operator to connect from a terminal 130 with the status of a super administrator, via a bus such as I2C, for example. The operator connects in a super administrator mode to the hardware platform 10 directly, to configure the hardware elements of this hardware platform. This configuration can be achieved, for example, according to the specifications of the IPMI (English acronym for "Intelligent Platform Management Interface") protocol, which is a standardized hardware management interface, provided primarily on the servers, independent of the operating system, and designed to allow for the control of some hardware components and for managing/handling the machine, locally or remotely. In an implementation example, the hardware configuration can be done in the factory, before the machine is delivered to the end client, thanks to a management software such as Bull System Manager, or Bull iCare, or Bull Platform Manager. It will be seen later that, in accordance with embodiments of the invention, this configuration prior to the use of the machine will comprise in particular the creation and allocation of hardware resource pools.

The hardware platform 10 comprises network interface cards such as cards 14 and 15, for access to a proprietary telecommunications network 141 and for access to external storage peripheral means 150, respectively.

The telecommunications network 141 is a specific network that allows authorized users to access the machine via calls to the proprietary operating system GCOS 7, via terminals 140, through a proprietary protocol. In this example, it is an OSI/DSA (from the English "Open Systems Interconnection/Distributed Standard Architecture") protocol. DSA is the name of the implementation in the form of a distributed system of the open system interconnection (OSI) model, which is provided specifically by BULL ATOS.

The card 15 itself is a network interface card (or NIC card, from the English "Network Interface Card") with at least one Ethernet port, through which the machine has access, via a network 151 under a TCP/IP protocol, to a backup (or backup) system 150 comprising a virtual library (or VTL, from the English "Virtual Tape Library"). The system 150 may for example operate in both disk-to-disk (D2D) and disk-to-disk-to-tape (D2D2T) mode. This is for example the Store Way Virtuo NV Series™ solution from BULL ATOS, hereafter shortened Virtuo, which is a unified solution for virtualizing the backup function on multiple open or proprietary environments in the Mainframe servers. The Virtuo architecture comprises a duplication/replication engine 154, and storage disks 155 that can offer more than 1 PB (petabyte) of disk space to back up the data with a data transfer rate of more than 45 TB/hour. The solution also comprises one or more peripheral tape drives 152, for example of the LTO (from the English "Linear Tape-Open") type, such as a drive of the LTO6 type, or a more recent one. LTO refers to an open format magnetic tape storage technique, which is the most popular format in the mid-range tape and tape drive market.

As a virtualization tool, Virtuo allows to ensure the data replication functionalities according to a master-slave scheme. It allows to ensure data consistency in order to improve reliability, fault tolerance, and availability. Advantageously, Virtuo is an archiving solution on an architecture of the market such as an architecture of the company SAVE SOLUTIONS®, for example, which is compatible not only with the proprietary operating systems GCOS from BULL ATOS, but also with the proprietary operating system z/OS® from IBM™.

However, the person skilled in the art will appreciate that, alternatively, the archiving system may be a proprietary system. In such a case, it can be accessed by a specific network according to a proprietary protocol, such as the network 141.

The hardware platform 10 further comprises one or more host bus controllers 16 (or HBAs, from the English "Host Bus Adapter"), which are expansion cards for connecting the host system, via an external bus, to an external storage network. This may be, for example, a specialized storage network 160, of the SAN (from the English "Storage Area Network") type. Such a storage network comprises physical storage resources, for example disks 164 in storage arrays. These resources are pooled and accessed, for example via optical fibers, through a low-level access which has the advantage of being fast and reliable. For that purpose, it is possible to use the FC (from the English "Fiber Channel") protocol, which is a protocol defined by the ANSI X3T11 standard, or its FCoE (from the English "Fiber Channel over Ethernet") variant when the frames of the FC protocol are transmitted over an Ethernet network. The host bus controllers 16 are then FC cards. It is a serial protocol, which only needs two physical conductors. It can therefore work not only on optical fiber, but also on twisted pair (namely, copper) or coaxial cable. This technology allows to reach high rates, for example of the order of 16 Gigabits/s. The topology of the network may be, as in the example shown, a switched topology (also called "switched"), as in the example shown where it is a fabric 161 comprising two network switches 162*a* and 162*b* and two routers 163*a* and 163*b*.

The hardware platform may further comprise other peripheral controllers, not shown, such as one or more USB controllers for connecting a mouse or an external hard disk, one or more Flash controllers for performing input/output operations on memory cards of this technology, etc.

Focus will now be in the software part 20 of the machine. It is based primarily on the proprietary operating system 22 of the manufacturer of the centralized server, namely GCOS 7 in the example considered here. The hardware platform expected by this operating system is emulated by a software simulator 21 like V7000, which is also called a V7000 VM virtual machine. This virtual machine is mounted on top of the previously described hardware architecture 10. Thus, the user programs 23 (or application programs, or simply applications) are launched on the proprietary operating system 22 when it is running on the hardware architecture 10, which is, however, managed by an open operating system 24, especially for scheduling, memory management and inputs-outputs. This allows to use a hardware platform of the market, which is less expensive and which benefits from more frequent evolutions.

The open operating system 24 is for example Windows™ W2012R2® or a newer version such as Windows Server 2016®. It should be noted, however, that the invention is not limited to these examples, and may in particular be applicable to other open operating systems, such as Linux® or operating systems derived therefrom. In addition, it is possible that the machine supports more than one open operating system in order to allow various and varied user programs to run on respective virtual machines, according to the specific needs of each implementation.

Thus, V7000 is a software provided by BULL for managing the GCOS 7 environment on the IA platform of the market controlled by an open operating system of the Microsoft™ Windows®-type. The function of this software element 21 is to emulate one or more instances of GCOS 7 on the IA platform so that the applications 23 (namely, the client user programs) that have been designed for a long time for the proprietary operating system 22 (and for some of them at the time of 100% proprietary servers DPS 7000), remain able to run as is on the IA platform of the market.

For this purpose, in particular, the native instruction set of the DPS 7000 defined by what is called the "interior decor", is retained in the virtual machine V7000 VM by means of a firmware that is associated with a micro-core 210 with a specific command interpreter. This offers the applications 23 an software visibility invariant compared to previous machines that were 100% proprietary. The virtualized processors 210 of the virtual machine 21 (or "thread processors" in English) are associated one for one with the cores of the physical processors $11_1$, $11_2$, ... of the platform 10.

The role of the input/output 211 processors (IOPs, from the English "Input/Output Processors") of the V7000 virtual machine is to support the inputs/outputs by supporting the channel programs generated by GCOS 7 for transforming them into inputs-outputs implementing the drivers of cards and peripherals controlled under the open operating system Windows. To this end, the modules 211 run on Windows and interface with the command interpreter of the virtual machine V7000 VM. Similarly, the virtual machine V7000 VM comprises a software component 212 (VCP7) also running on Windows, for reproducing the operation of the telecommunications servers supporting the various proprietary protocols (including OSI/DSA).

For the administration, the virtual machine V7000 VM comprises software modules 213 (SAM modules, from the English "System Administration & Management"), which also run on Windows and ensure the administration of GCOS 7, of V7000, of VCP7 and of the interoperability modules 25 and 26 (see below) according to a client-server model. More particularly, it is the server part that runs on the virtual machine V7000 VM as a Windows service.

The virtual machine V7000 VM further comprises a service module 214 dedicated to the V7000 Administration Server (VAS, from the English "V7000 Administration Server") and a service module 215 dedicated to the control of the system (SYC, for "System Control"). These modules 214 and 215 also operate according to the client-server model.

Finally, the mainframe computer shown in FIG. 1 comprises two interoperability modules 25 and 26, which have the particularity of running directly on the open operating system 24. This number is only an example, since other similar interoperability modules can be provided according to the needs of the implementation. There can also be only one.

The interoperability modules 25 and 26 run on Windows and allow to access open-world applications, from GCOS 7 applications. The first module 25 is for example an INTEROP 7 gateway (or "INTEROP 7 Gateway"), which allows, for example, to access an external SQL server from GCOS 7, by making SQL requests via a network 251 which can be a TCP/IP network.

The module 26 provides access to remote databases, or to open-world applications validated by the manufacturer. To ensure these different access in under perfect interoperability conditions, there is a high-speed link (or HSL, from the English "High Speed Link") mechanism using a shared memory area between GCOS 7 and Windows. This area allows to exchange data, make rebounds to remote applications, convey data via an IP protocol for requests and data, and perform file transfers via FTP from GCOS 7 applications to remote machines under Linux®, under Windows® or under AIX® (AIX® is a registered trademark from IBM Corporation™). This mechanism is described in detail in patent application FR-A 2 284 008, to which the reader can refer as needed.

With reference to the functional diagram of FIG. 2, embodiments of the invention will now be described. As shown in this figure, the mainframe computer according to some embodiments differs from that of FIG. 1 in that it comprises a virtualization hypervisor software 300, which is a virtualization hypervisor of the market. In other words, it is not specific to the invention. In a non-limiting example, it may be a software of the VMware range, for example VMware™ vSphere® ESXi. But it can also be any other equivalent virtualization hypervisor of the market.

A proprietary Mainframe software environment 1 is composed of a software package consisting of a proprietary simulator 101, a proprietary operating system 102, running on the proprietary simulator 101, several interoperability components 105 and 106 between the proprietary operating system 102 and the open systems and databases with which it can communicate and interact. This environment also includes an open operating system 104 of the Microsoft Windows Server®- or Linux®-type on which the proprietary simulator 101 runs, the proprietary operating system 102 (through the proprietary simulator 101) and the interoperability components 105 and 106. The complete software Mainframe environment, including the proprietary simulator 101, the proprietary operating system 102, the interoperability components 105 and 106, as well as the open operating system 104, runs on a physical server based on a contemporary hardware architecture 100 of the Intel® Architecture (IA)-type.

For the sake of simplicity, it will be sufficient here to refer the reader to the description given above of the software environment 20 of the mainframe computer of FIG. 1. Indeed, the following functional identities may be mentioned:

the proprietary operating system 102 of the environment 1 of FIG. 2 corresponds to the operating system 22 of FIG. 1 (namely GCOS 7 in the example);

the applications 103 of the environment 1 of FIG. 2 correspond to the applications 23 of FIG. 1;

the open operating system 104 of the environment 1 of FIG. 2 corresponds to the operating system 24 of FIG. 1, namely Windows Server 2016® in the example; and, the interoperability components 105 and 106 of the environment 1 of FIG. 2 correspond to the interoperability components 25 and 26 of FIG. 1.

From a software point of view, the only difference is that the virtual machine V7000 VM runs entirely and only on the open operating system 104, namely Windows™, in a Mainframe virtual machine that is controlled by the virtualization hypervisor 300, for running it on the hardware platform 10. In other words, the proprietary simulator 101 and the proprietary operating system 102 run on an open operating system 104, in a virtualized software environment that runs on the hardware platform 10 under the control of the virtualization hypervisor software 300. Thus, the applications 103 run transparently on the physical processors of the hardware platform 100.

The aforementioned Mainframe virtual machine here is a proprietary Mainframe software environment deployed in a virtual machine managed by a standard hypervisor of the market. It corresponds to a kind of container defining the hardware envelope of the machine with a proprietary operating system embedded in the container, able to use the material resources made available thereto.

In accordance with implementation modes of the invention, the material resources of the hardware platform comprise a first hardware resource pool 100 which is configured, by an ad hoc configuration of the virtualization hypervisor 300 for hosting, exclusively, the first Mainframe virtual machine (namely, the virtual machine managed by the hypervisor 300 in which the proprietary Mainframe software environment is running). Building this pool of dedicated resources, also called the "proprietary pool", restores the capacity for ensuring the security and the level of performance that are specific to Mainframe applications. Advantageously, this first hardware resource pool 100 includes hardware resources from at least two independent physical servers. Thus, the hardware platform 10 within the meaning of the invention may include several independent physical servers.

In fact, the processing power level (associated with the processors) available for the one (or more) Mainframe virtual machine(s) is guaranteed due to the management of the settings of the virtualization hypervisor VMware™ vSphere® Thus, the response time, considered from the point of view of the applications, is almost constant. In addition, the settings of the virtualization hypervisor VMware can be leveraged in order to run the GCOS 7 applications on the physical processors in the dedicated pool 100 without restoring Windows Server 2016® or the hypervisor VMware™ vSphere®.

Defining the resource pool of the hardware platform that is dedicated to hosting the one (or more) Mainframe virtual machine(s), namely, allocating the hardware resources dedicated to the Mainframe environment, depends on the performance model targeted in terms of processing power and memory resource, and given the maximum number of Mainframe virtual machine instances provided for in the specifications. Advantageously, the Mainframe may provide a range of power models (namely, a processing power combined with a certain memory capacity) covering a range from a minimum value weight to a maximum value weight. As the person skilled in the art knows, the notion of weight only makes sense in the Mainframe environment since it represents a guaranteed proprietary processor power.

In some implementations of the mainframe computer, multiple instances of the proprietary operating system GCOS 7 may run simultaneously on respective Mainframe virtual machines, all running on the virtualization hypervisor, by means of the hardware resources dedicated to the proprietary Mainframe that belong to the resource pool 100.

Thus, in the example shown in FIG. 2, not only is there the Mainframe environment 1 described above, but there is also another Mainframe environment 2 which is running simultaneously and concurrently on the hardware platform 10. This Mainframe environment 2 is identical to the Mainframe environment 1 already described, and is therefore not described in detail here. Advantageously, the different instances associated with this plurality of Mainframe environments (for example GCOS 7) are all virtualized under the control of the virtualization hypervisor 300. It is therefore at the level thereof that the necessary hardware resources (physical processors and memory) are called. This is a simple solution for running several instances of GCOS 7 simultaneously, with the allocation of resources only proceeding from configuring the hypervisor 300 (see below).

Alternatively or in addition, one or more instances of an open operating system ("open OS" in English) may run simultaneously on respective virtual machines, all running on the virtualization hypervisor 300, by means of other hardware resources that are dedicated to the open-world applications. These other resources may be organized as a pool 200 of resources separated and isolated from the resources of the pool 100.

In the example shown in FIG. 2, there is therefore an open software environment 3 comprising an instance 31 of the operating system Microsoft™ Windows® (for example Windows 2016 Server®), which is running on the resource pool 200, and on which open-world applications 32 are running. Likewise, there is also an open software environment 4 comprising an instance 41 of the operating system Linux®, on which open-world applications 42 are running.

Thus, the mainframe computer according to some embodiments can support open-world applications, which allows the client to use programs of the market or at least that do not need to have been designed by specialists of the proprietary operating system GCOS 7. This reduces the cost of deploying additional features, as such features appear in the open world. Also, the mainframe computer can interface with external resources, remotely or not, possibly via an extended telecommunications network, such as databases to which the client has access. It also allows to provide more interoperability possibilities with a wide range of peripherals. In a general way, the invention allows the mainframe computer to access more open world resources or peripherals, and at a lower cost, and in particular to resources of the "Linux world", in a mainframe computer running, from the point of view of the user programs 103, under the proprietary operating system GCOS 7.

Reserving resources through the constitution and allocation of the resource pools 100 and 200 is a configuration of the virtualization hypervisor 300 which falls within the competence of a super administrator. This configuration can be done at the factory by the manufacturer, namely, before the mainframe computer is delivered to the client, via a terminal such as the terminal 130 already described with reference to the diagram of FIG. 1. This terminal 130 may be connected to the machine via the already described management controller 13 (iBMC). As for an operator with an administrator status at the client (also called a "GCOS 7 administrator"), he can stop and start GCOS 7 virtual machines such as instances 1 and 2, depending on the needs specific to the use. But he cannot change the hypervisor configuration regarding the definition of the resource pools 100 and 200, so as not to affect the level of security and performance guaranteed by the manufacturer.

The configuration of the hardware resource pool 100 dedicated to the proprietary Mainframe software environment is such that it is possible to guarantee a quantity of resources available to GCOS 7 that is sufficient regardless of the hypervisor load caused by the application virtual machines such as the virtual machines 3 and 4. In other words, the security, performance and availability of the Mainframe environment may be considered as equivalent to those of existing mainframe computers, and that, regardless of the number of application virtual machines likely to run instances of an open operating system (number which is, moreover, not determined during the manufacturing and the configuration of the server, and is not necessarily controlled during use).

Conversely, the maximum number of virtual machine instances in the proprietary Mainframe software environment that can potentially run concurrently on the hardware platform, and their respective performance models, are known when configuring the mainframe computer in the factory, since this is part of the specifications to be complied with by the manufacturer. This is why the pool 100 of hardware resources dedicated to the Mainframe environment may be sized in such a way that it will be possible for all the instances planned (such as instances 1 and 2) to be hosted in the hardware resource pool 100 of the hardware platform 10, guaranteeing their respective performance levels. This does not change with respect to the sizing of existing mainframe computers.

It should be noted that the allocation of hardware resource pools (CPU power and memory capacity) is a native feature of the virtualization hypervisors VMware. However, the person skilled in the art will appreciate that it is a paradox to use it, in accordance with the embodiments of the invention, for running instances of a proprietary operating system that are subject to strong security, performance and availability constraints. Indeed, it seems counterproductive to use virtualization, the purpose of which is, contrary to the usual considerations in a mainframe computer, to share and pool the hardware resources between all the virtual machines by focusing on the flexibility and operational tolerance of virtual machines. This paradox is overcome, according to the embodiments, thanks to the constitution of the pool of hardware resources dedicated to running the different instances of the proprietary Mainframe software environment.

The security also comes from the verification, when starting a virtual machine on the pool 100 of resources that are dedicated exclusively to the applications running on the proprietary operating system 102, that it runs well on the hardware platform of a proprietary machine. This aims to protect against the duplication of the GCOS 7 virtual machines on machines other than the one(s) originally planned when delivering the Mainframe server to the client. By proprietary machine(s), is meant here the different server modules combined in the equipment that is provided to the client by the manufacturer of the mainframe computer.

Currently, what can be provided thanks to the second phase of virtualization according to the implementation modes of the invention, are servers with four sockets, therefore with two modules like the one presented above with reference to the diagram of FIG. 1.

However, the architecture according to the invention allows to provide servers with one or more server modules as described above with reference to the diagram of FIG. 1. Each module has two sockets, and can therefore integrate two 32-bit Intel® Xeon® processors, for example. The servers may have two, four, eight, or sixteen sockets, or even more, depending on the number of modules delivered with the server, one, two, four, or eight modules, respectively. In other words, in the mainframe computers from BULL ATOS of the Bullion range, there may be from two to sixteen processors, with two processors per server module each equipped with two sockets accommodating the processors. In terms of space requirement, each server module is a 3U-sized module.

Advantageously, implementing the invention does not preclude the migration of an instance of the proprietary Mainframe software environment, namely, of a GCOS 7 instance in the example considered here, from a server on which it was opened to another server. It is sufficient to migrate the corresponding virtual machine, which does not pose any difficulty to the person skilled in the art, to the administration level of the virtualization server 300.

In other words, in some embodiments, the virtualization hypervisor software may be configured to allow the migration of an instance of the proprietary Mainframe software environment, from a first server to a second server each one having hardware resources participating in the Mainframe pool 100 of hardware resources dedicated to the Mainframe environment. This allows to meet the constraints of high availability (in English HA High Availability) of the proprietary Mainframe software environment (GCOS 7 Mainframe instance). This is for example possible thanks to the migration of the first virtual machine (hosting the GCOS 7 Mainframe instance) located on a physical server, to another physical server. This can be done in the moment, that is to say, without stopping the instance of the proprietary Mainframe software environment. This is therefore completely invisible to the end user connected to the instance of the Mainframe software environment (for example GCOS7 Mainframe). Thus, a physical server may be completely stopped for maintenance for example, without stopping the availability of the GCOS7 mainframe.

For telecommunications, a proprietary telecommunications network such as the network 141 of FIG. 1, which is a specific network, is transferred to the virtualization hypervisor 300. The person skilled in the art will appreciate that this does not pose any difficulty with a hypervisor of the VMware range, in particular, which is fundamentally based on the IP protocol of Ethernet networks. Thus, in some embodiments, the GCOS 7 users may continue to access the machine, via network terminals. These may be specific terminals such as the terminal 140 of FIG. 1, through a proprietary protocol such as the OSI/DSA protocol, already presented above with reference to FIG. 1, which is specifically provided by BULL ATOS. In other words, the implementation modes of the invention do not call for any particular modifications regarding the management of the one (or more) telecommunications network(s) which is(are) associated with the mainframe computer.

The same remarks apply, where appropriate, to the use of a backup system and especially the access to the tape drives, and in addition to a specialized storage network of the SAN type, such as the system 150 and the network 160 which have been previously described with reference to the functional diagram of FIG. 1. It is considered that their management in mainframe computers implementing the invention does not pose any particular difficulty to the person skilled in the art, who knows how to configure the virtualization hypervisor 300 to ensure the interface with these devices.

In other words, in some implementation modes, the virtualization hypervisor 300 is configured to allow access by the instances 1 and 2 of the proprietary Mainframe software environment to an external backup system 150 (FIG. 1) and/or to a specialized storage network 160 (FIG. 1).

The present invention has been described and illustrated in the present detailed description and in the figures of the accompanying drawings, in possible embodiments. The present invention is not limited, however, to the embodiments shown. Other variants and embodiments may be deduced and implemented by the person skilled in the art upon reading the present description and the accompanying drawings.

In the claims, the term "comprise" or "include" does not exclude other elements or other steps. A single processor or several other units may be used to implement the invention. The various features presented and/or claimed may be advantageously combined. Their presence in the description or in different dependent claims do not exclude this possibility. The reference signs cannot be understood as limiting the scope of the invention.

The invention claimed is:

1. A mainframe computer including:
a hardware platform with hardware resources comprising processors and memory;
a virtualization hypervisor software of a market;
a proprietary mainframe software environment, of which at least one instance is configured to run on the hardware platform, in at least one first virtual machine that is configured to run on the virtualization hypervisor,
wherein the virtualization hypervisor is configured to create a first hardware resource pool of the hardware platform that is dedicated to hosting, exclusively, the at least one first virtual machine in which the at least one instance of the proprietary mainframe software environment is configured to run, and
wherein the at least one instance of the proprietary mainframe software environment comprises a proprietary simulation software, a proprietary operating system that runs on the proprietary simulation software, and an open operating system on which the proprietary simulation software and the proprietary operating system run.

2. The mainframe computer according to claim 1, wherein the proprietary operating system is responsible for ensuring connection between the hardware resources of the first hardware resource pool through the proprietary simulation software and applications designed to run on said proprietary operating system when said applications are running.

3. The mainframe computer according to claim 1, wherein the at least one instance of the proprietary mainframe software environment further comprises one or more interoperability components between the proprietary operating system and open systems and external databases with which the at least one instance of the proprietary mainframe software environment is configured to communicate and interact, wherein said interoperability components are able to run on the open operating system.

4. The mainframe computer according to claim 1, wherein the virtualization hypervisor software is configured to run several instances of the proprietary Mainframe software environment, with respective performance models, in respective virtual machines that are configured to run concurrently on the hardware platform while being all hosted in the first hardware resource pool of the hardware platform.

5. The mainframe computer according to claim 1, further comprising:
an open software environment, at least one instance of which is able to run concurrently on the hardware platform, in at least one second virtual machine that is configured to run on the virtualization hypervisor software,
wherein:
the hardware resources of the hardware platform comprise a second hardware resource pool created by configuring the virtualization hypervisor, for hosting, exclusively, the at least one second virtual machine; and,
the open software environment comprises a further open operating system responsible for ensuring connection between the hardware resources of the second hardware resource pool, on the one hand, and open-world applications designed to run on said further open operating system, on the other hand, when said applications are running.

6. The mainframe computer according to claim 5, wherein the virtualization hypervisor software is configured to run several virtual machine instances of the open software environment that are configured to run concurrently on the hardware platform, while being all hosted in the second hardware resource pool of the hardware platform.

7. The mainframe computer according to claim 1, wherein the virtualization hypervisor software is configured to allow migration of the at least one instance of the proprietary mainframe software environment, from a first server to a second server, each of the first and second servers having hardware resources participating in the first hardware resource pool, so as to meet availability constraints of the mainframe computer.

8. The mainframe computer according to claim 1, wherein the virtualization hypervisor is configured to allow access by the at least one instance of the proprietary mainframe software environment to an external backup system and/or to a specialized storage network.

9. The mainframe computer according to claim 1, wherein the virtualization hypervisor is configured to protect against a duplication of the at least one first virtual machine running on a second hardware platform.

10. A method of configuring a mainframe computer for obtaining a mainframe computer having a virtualized proprietary mainframe software environment, said computer including a hardware platform with hardware resources comprising processors and memory, wherein the method comprises the following steps:

installing a virtualization hypervisor software of a market;
  installing an open operating system;
  installing a proprietary mainframe software environment, at least one instance of which is configured to run on the hardware platform, in at least one first virtual machine that is configured to run on the virtualization hypervisor, wherein the at least one instance of the proprietary mainframe software environment comprises a proprietary simulation software, a proprietary operating system that runs on the proprietary simulation software, and an open operating system on which the proprietary simulation software and the proprietary operating system run; and,
  configuring the virtualization hypervisor to create a first hardware resource pool of the hardware platform that is dedicated to hosting, exclusively, the at least one first virtual machine in which the at least one instance of the proprietary mainframe software environment is configured to run.

11. The method according to claim 10, wherein installing the proprietary mainframe software environment comprises:

installing a proprietary simulation software so that the proprietary simulation software is configured to run on the open operating system; and
  installing a proprietary operating system so that the proprietary operating system is configured to run on the proprietary simulation software, for ensuring connection between the hardware resources of the first hardware resource pool through the proprietary simulation software, on the one hand, and applications designed to run on said proprietary operating system, on the other hand, when said applications are running while the proprietary simulation software and the proprietary operating system are running on the open operating system.

12. The method of configuring a mainframe computer according to claim 10, wherein the virtualization hypervisor is configured to protect against a duplication of the at least one first virtual machine running on a second hardware platform.

* * * * *